United States Patent
Jung

(10) Patent No.: US 7,366,506 B2
(45) Date of Patent: Apr. 29, 2008

(54) REMOTE CONTROL SYSTEM IN MOBILE COMMUNICATION TERMINAL AND METHOD THEREOF

(75) Inventor: Soo-Yong Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/336,784

(22) Filed: Jan. 23, 2006

(65) Prior Publication Data

US 2006/0116137 A1 Jun. 1, 2006

Related U.S. Application Data

(63) Continuation of application No. 10/194,067, filed on Jul. 15, 2002, now Pat. No. 7,050,797.

(30) Foreign Application Priority Data

Jul. 16, 2001 (KR) .............................. 2001-42939

(51) Int. Cl.
*H04M 3/00* (2006.01)
(52) U.S. Cl. ..................... 455/420; 455/419; 455/127.1
(58) Field of Classification Search ................ 455/420, 455/458, 9, 418, 419, 13.4, 127.1, 522
See application file for complete search history.

(56) References Cited

U.S. PATENT DOCUMENTS

| | | | |
|---|---|---|---|
| 5,646,605 A | 7/1997 | Leonaggeo et al. | |
| 5,706,211 A | 1/1998 | Beletic et al. | |
| 5,778,315 A * | 7/1998 | Proietti | 455/419 |
| 5,845,203 A | 12/1998 | LaDue | |
| 5,873,043 A | 2/1999 | Comer | |
| 6,028,537 A | 2/2000 | Suman et al. | |
| 6,088,431 A | 7/2000 | LaDue | |
| 6,175,732 B1 * | 1/2001 | McDaniel et al. | 455/433 |
| 6,311,056 B1 | 10/2001 | Sandidge | |
| 6,430,601 B1 | 8/2002 | Eldridge et al. | |
| 6,442,372 B1 | 8/2002 | Laham et al. | |
| 6,578,034 B1 | 6/2003 | Rafanello | |
| 7,013,159 B2 * | 3/2006 | Lee | 455/522 |
| 2002/0068983 A1 | 6/2002 | Sexton | |
| 2002/0113686 A1 | 8/2002 | Carravallah | |
| 2003/0003907 A1 | 1/2003 | Lai et al. | |

* cited by examiner

*Primary Examiner*—Congvan Tran
(74) *Attorney, Agent, or Firm*—KED & Associates, LLP

(57) ABSTRACT

Disclosed is a remote control system in a mobile communication terminal and method thereof enabling a user to use the mobile communication terminal not only passively but also actively. The present invention includes a first step of receiving a remote control command from a subscriber, a second step of recording the remote control command in a reserved field of the page message, a third step of transmitting the page message to the mobile communication terminal, and a fourth step of having the mobile communication terminal operate in accordance with the remote control command included in the page message. The fourth step includes the steps of verifying a species of the received page message by parsing the received page message, extracting the remote control command by analyzing the reserved field of the page message if the received page message is for controlling the mobile communication terminal remotely, and controlling an operating state of the mobile communication terminal in accordance with the extracted remote control command.

23 Claims, 4 Drawing Sheets

FIG. 2

| FIELD | LENGTH(bits) |
|---|---|
| CONFIG_MSG_SEQ | 6 |
| ACC_MSG_SEQ | 6 |
| CLASS_0_DONE | 1 |
| CLASS_1_DONE | 1 |
| TMSI_DONE | 1 |
| ORDERED_TMSIS | 1 |
| BROADCAST_DONE | 1 |
| RESERVED | 4 |
| ADD_LENGTH | 3 |
| ADD_PFIELD | 8 x ADD_LENGTH |

FIG. 3A

| CONTROL | FUNCTION |
|---|---|
| '0000' | UNKNOWN OR UNSPECIFIED |
| '0001' | POWER ON |
| '0010' | POWER OFF |
| '0011' | LOCK CODE INPUT |
| OTHER VALUES ARE RESERVED | |

FIG. 3B

| CONTROL | FUNCTION |
|---|---|
| '0000' | UNKNOWN OR UNSPECIFIED |
| '0001' | POWER ON |
| '0010' | POWER OFF |
| '0011' | LOCK CODE INPUT |
| '0100' | WARNING MESSAGE SEND |

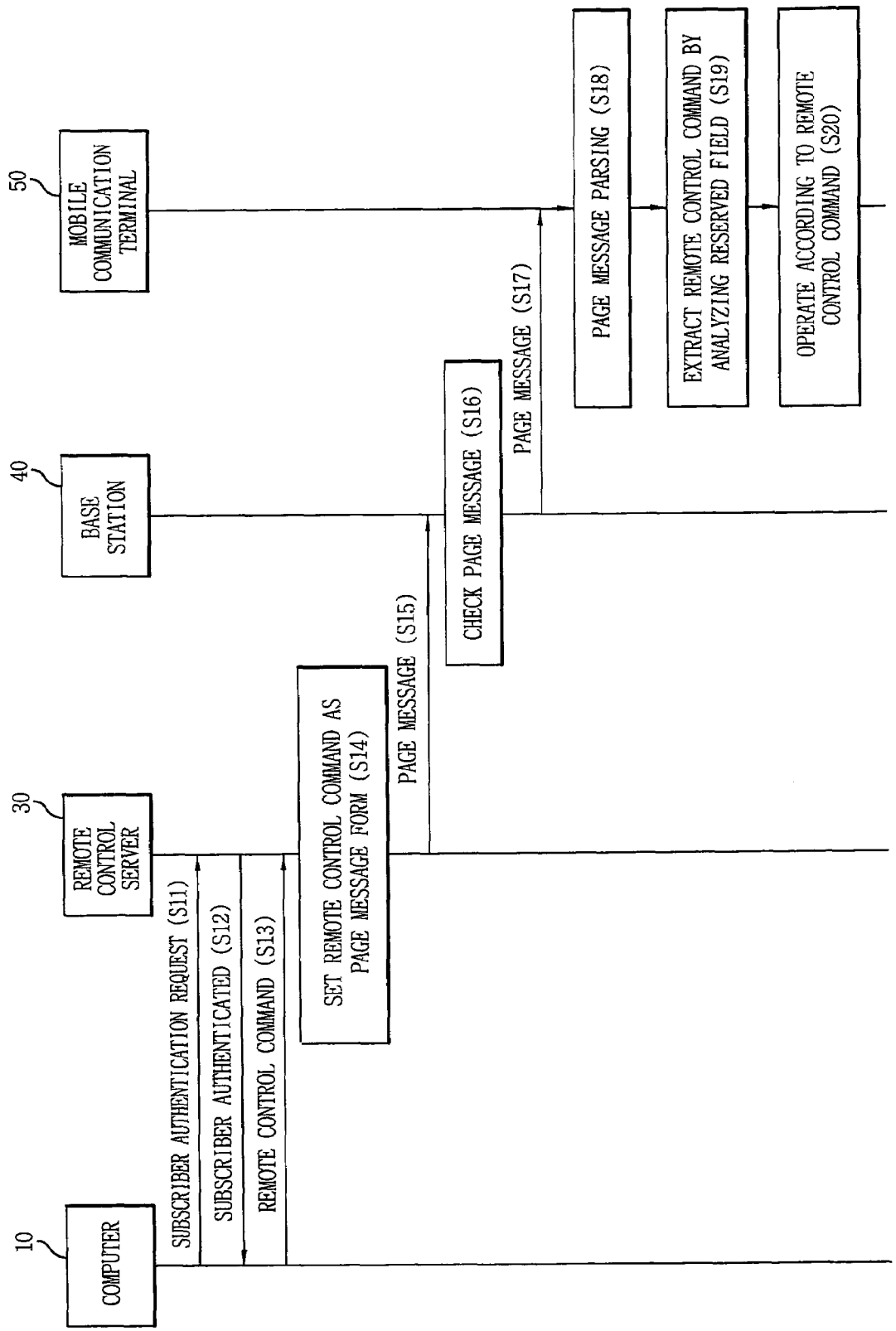

REMOTE CONTROL SYSTEM IN MOBILE COMMUNICATION TERMINAL AND METHOD THEREOF

This application is a Continuation Application of application Ser. No. 10/194,067 filed Jul. 15, 2002, now U.S. Pat. N.o. 7,050,797 the subject matter of which is incorporated herein by reference.

BACKGROUND OF THE INVENTION

1. Field of the Invention

The present invention relates to a mobile communication system, and more particularly, to a remote control system in a mobile communication terminal and method thereof.

2. Background of the Related Art

Generally, channels used for a forward link include a pilot channel, a synchronization channel, a paging channel, and a traffic channel. And, channels used for a reverse link include an access channel and a traffic channel.

The pilot channel exists in every base station or sector, and is emitted continuously. When a power of a mobile communication terminal is turned on, the mobile communication terminal comes into meeting the pilot channel. The pilot channel is previously fixed to one of sixty-four Walsh codes so that the mobile communication terminal is easily synchronized with the pilot channel. Synchronized with the pilot channel is achieved, the mobile communication terminal comes into meeting the synchronization channel.

The synchronization channel is always emitted from the base station continuously, and fixed to one of sixty-four Walsh codes so that the mobile communication terminal is easily synchronized with the synchronization channel. The mobile communication terminal receives a long code synchronization information inside the base station which is the most important communication information with the base station, a current system time, a data rate of a paging channel, and the like from the synchronization channel. The mobile communication terminal sets up a system time using the transferred message from the synchronization channel for a precise communication with the base station, and then starts to search the paging channel.

The paging channel is continuously emitted from the base station. The base station and the mobile communication terminal exchange various parameters and information with each other using the paging channel so as to maintain a continuous communication relationship with each other. Besides, the base station transfers a voice call to the mobile communication terminal using the paging channel. Messages transmitted through the paging channel include a system overhead message, a page message, and a channel allocation message for allocation of the traffic channel.

The traffic channel is a channel through which data to be transmitted/received are substantially transferred.

The access channel is a channel used when the mobile communication terminal tries a call to the base station. Information about originating transmission for call trial, response, and registration are transmitted/received through the access channel.

The mobile communication terminal sends/receives messages to/from the mobile communication system through the forward and reverse link channels so as to be provided with a mobile communication service.

Yet, a subscriber, who loses or is robbed of the mobile communication terminal, fail to control the mobile communication terminal remotely in direct, whereby someone holding the mobile communication terminal can use the mobile communication terminal arbitrarily.

Moreover, only when the subscriber calls a service center personally to ask stop providing the service of the lost mobile communication terminal, a service personnel of the service center controls the mobile communication terminal to stop servicing. In this case, the service personnel gain access to a data base system to change the subscriber's registration information so as to stop the service of the mobile communication terminal. The subscriber's registration information handles by the data base system in the mobile communication system is not changed by the subscriber directly but by the authorized service personnel. Hence, such a service stop of the mobile communication terminal can not be regarded as an active use of the mobile communication terminal by the subscriber.

Thus, in a general mobile communication system, the subscriber generally uses the mobile communication terminal passively.

Therefore, a remote control method of the mobile communication terminal may be used so as to minimize the loss or damage caused by a random use of the mobile communication terminal by a stranger as well as enable the subscriber to use the mobile communication terminal actively.

SUMMARY OF THE INVENTION

Accordingly, the present invention is directed to a remote control system in a mobile communication terminal and method thereof that substantially obviates one or more problems due to limitations and disadvantages of the related art.

An object of the present invention is to provide a remote control system in a mobile communication terminal and method thereof enabling a user to use the mobile communication terminal not only passively but also actively.

Another object of the present invention is to provide a remote control system in a mobile communication terminal and method thereof enabling to minimize the random use or loss of the mobile communication terminal by a stranger by having the subscriber control remotely the lost mobile communication terminal using Internet.

A further object of the present invention is to provide a remote control system in a mobile communication terminal and method thereof enabling to minimize a system change as well as control the mobile communication terminal remotely by transmitting information for remote control of the mobile communication terminal using a previously used page message.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a remote control system in a mobile communication terminal according to the present invention includes a computer receiving a remote control command for controlling the mobile communication terminal from a subscriber, a remote control server generating a page message using the inputted remote control command, a base station transmitting the page message transmitted from the remote control server, and a mobile communication terminal operating in accordance with the remote control command included in the page message transmitted from the base station.

In another aspect of the present invention, a remote control method of a mobile communication terminal includes a first step of transmitting a remote control command inputted from a subscriber to the mobile communication terminal using a page message and a second step of operating the mobile communication terminal in accordance with the remote control command included in the page message.

In a further aspect of the present invention, a remote control method of a mobile communication terminal includes a first step of receiving a remote control command from a subscriber, a second step of recording the remote control command in a reserved field of the page message, a third step of transmitting the page message to the mobile communication terminal, and a fourth step of operating the mobile communication terminal in accordance with the remote control command included in the page message.

In another further aspect of the present invention, a page message for controlling a mobile communication terminal remotely includes a first field indicating a sequence of a configuration message, a second field indicating a sequence of an access message, a third field paging all mobile communication terminals allocated to "page class 0", a fourth field paging other mobile communication terminals allocated to "page class 1", a fifth field paging a mobile communication terminal using a temporary mobile station identity (TMSI), a sixth field paging all mobile communication terminals of TMSI class in ascending numerical order, a seventh field for broadcast pages, a reserved field of four bits for recording a remote control command inputted from a subscriber so as to control the mobile communication terminal remotely, an eighth field indicating a length of a specific field added to a page message, and a ninth field indicating the added specific field.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a table for a general page message;

FIG. 3A illustrates an exemplary table of control values set up in a four bits reserved field of a page message according to an embodiment of the present invention;

FIG. 3B illustrates an exemplary table of control values for a mobile communication terminal remote control; and FIG. 4 illustrates a flowchart of a mobile communication terminal remote control method according to an embodiment of the present invention.

DETAILED DESCRIPTION OF THE INVENTION

Figure 1:
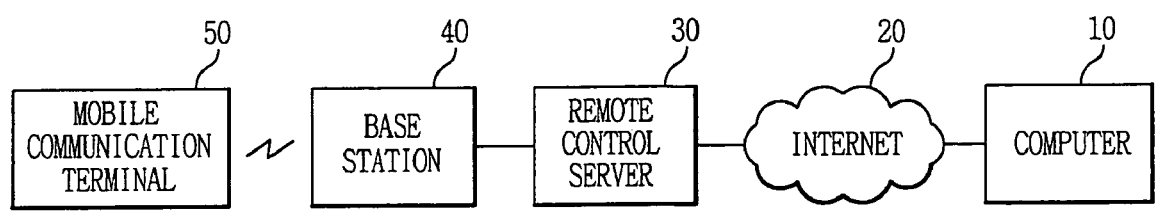
FIG. 1 illustrates a block diagram of a remote control system in a mobile communication terminal according to an embodiment of the present invention.

Reference will now be made in detail to the preferred embodiments of the present invention, examples of which are illustrated in the accompanying drawings.

FIG. 1 illustrates a block diagram of a remote control system in a mobile communication terminal according to an embodiment of the present invention.

Referring to FIG. 1, a remote control system in a mobile communication terminal includes a computer 10 receiving a remote control command from a subscriber, a remote control server 30 generating a page message using the remote control command when the inputted remote control command is received through Internet 20, a base station 40 transmitting the page message transmitted from the remote control server 30, and a mobile communication terminal 50 operating in accordance with the remote control command included in the page message transmitted from the base station 40.

In the present invention, the remote control server 30 connected to a mobile switching center (MSC) of a mobile communication system transmits the remote control command inputted by the subscriber to the mobile communication terminal 50 using a general page message in the message transmitted through a paging channel.

FIG. 2 illustrates a table for a general page message.

Referring to FIG. 2, a general page message includes a CONFIG_MSG_SEQ field indicating a sequence of a configuration message, an ACC_MSG_SEQ field indicating a sequence of an access message, a CLSS_0_DONE field paging all mobile communication terminals allocated to "page class 0", a CLASS_1_DONE field paging all mobile communication terminals allocated to "page class 1", a TMSI_DONE field paging a mobile communication terminal using a temporary mobile station identity (TMSI), an ORDERED_TMSIS field paging all mobile communication terminals of TMSI class in ascending numerical order, a BROADCAST_DONE field for broadcast pages, a reserved field of four bits, an ADD_LENGTH field indicating a length of a specific field added to a page message, and an ADD_PFIELD field indicating the added specific field.

A mobile communication terminal and a base station exchange the above-constituted general page message with each other in general thereby enabling to cope with a call receiving or a call transmitting promptly.

The present invention enables the subscriber to control his mobile communication terminal remotely using the 4-bits reserved field.

FIG. 3A illustrates an exemplary table of control values set up in a 4-bits reserved field of a page message according to an embodiment of the present invention.

Referring to FIG. 3A, "0000" is an unknown value, "0001" is a control value for turning on a power of the mobile communication terminal 50, "0010" is a control value for turning off the power of the mobile communication terminal 50, and "0011" is a control value for operating the mobile communication terminal 50 as being locked.

With the control values shown in FIG. 3A, FIG. 3B illustrates an example that another control value "0100" is added thereto so that a warning message is displayed by the mobile communication terminal 50.

The reserved field of the above page message consists of four bits, thereby enabling to set up sixteen kinds of control values.

Operation of the remote control system in the mobile communication terminal according to an embodiment of the present invention is explained by referring to FIG. 4 as follows.

FIG. 4 illustrates a flowchart of a mobile communication terminal remote control method according to an embodiment of the present invention.

Referring to FIG. 4, when a mobile communication terminal 50 is lost or missing, a subscriber wanting to control the mobile communication terminal 50 remotely tries to gain access to a remote control server 30 using a computer 10.

Receiving subscriber registration information such as a phone number of the mobile communication terminal 50, an identity (ID), social security number, and the like from the subscriber, the computer 10 requests the remote control server 30 to execute a subscriber authentication (S11).

The remote control server 30 executes the subscriber authentication using the subscriber registration information inputted from the computer 10, and then informs the computer 10 of a subscriber authentication success when the subscriber authentication succeeds (S12).

With the success of the subscriber authentication, the subscriber inputs a remote control command for controlling the mobile communication terminal 50 remotely to the computer 10, and then the computer 10 transmits the remote control command to the remote control server 30 through Internet 20(S13).

The remote control server 30 generates a page message using the transmitted remote control command. Namely, the remote control server 30 sets a control value representing the remote control command in a 4-bits reserved field of the page message (S14), and then transmits the page message to the base station 40 (S15).

The base station 40 parses the reserved field of the page message so as to check whether the page message is a general page message or another message including the remote control command to be transmitted to a mobile communication terminal (S16), and then transmits the page message to the corresponding mobile communication terminal 50 (S17).

The mobile communication terminal 50 parses the received page message so as to judge a species of the page message (S18). Namely, the mobile communication terminal 50 judges whether the received page message is a page message for a voice calling, a receiving standby, or a subscriber's remote control. If the received page message is for the subscriber's remote control, the mobile communication terminal 50 analyzes the reserved field of the page message so as to extract the remote control command (S19).

A main control unit (not shown in FIG. 1) of the mobile communication terminal 50 transmits the extracted remote control command to a user interfacing unit (UI) of the mobile communication terminal 50, and the user interfacing unit controls a state of the mobile communication terminal 50 in accordance with the transmitted remote control command. For instance, if the remote control command is a power-off command, as shown in FIG. 3A and FIG. 3B, the user interfacing unit turns off the power of the mobile communication terminal 50. If the remote control command is a locking command, the user interfacing unit makes the mobile communication terminal 50 be locked (S20).

The remote control system in the mobile communication terminal according to the present invention records the subscriber's remote control command inputted through Internet in the reserved field of the page message, and then transmits the recorded remote control command to the corresponding mobile communication terminal. Therefore, the user enables to control the mobile communication terminal remotely.

Accordingly, in a remote control system in a mobile communication terminal and method thereof according to the present invention, the command for the remote control of the mobile communication terminal received from the subscriber is transmitted to the mobile communication terminal, whereby the subscriber enables to control remotely the mobile communication terminal.

Moreover, as the subscriber enables to control remotely the mobile communication terminal, the present invention enables to prevent an unauthorized use of the mobile communication terminal by a stranger or minimize the corresponding subscriber's damage or loss when the mobile communication terminal is lost or missing.

Besides, the remote control command for controlling the mobile communication terminal is transmitted using the reserved field of the page message which is previously used in general, thereby enabling to minimize a system modification as well as control the mobile communication terminal remotely.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A remote control method of a mobile communication terminal, comprising:
   receiving a remote control command transmitted from base station using a page message, wherein the remote control command is generated based on information from a subscriber located remotely from the mobile communication terminal; and
   operating the mobile communication terminal in accordance with the remote control command included in the page message, wherein the operating the mobile communication terminal comprises:
      verifying a species of the page message by parsing the page message,
      extracting the remote control command by analyzing the page message if the page message is for controlling the mobile communication terminal remotely, and
      controlling an operating state of the mobile communication terminal in accordance with the extracted remote control command.

2. The method of claim 1, wherein the remote control command relates to a power off command of the mobile communication terminal.

3. The method of claim 1, wherein the remote control command relates to a warning message of the mobile communication terminal.

4. The method of claim 1, wherein the remote control command relates to locking of the mobile communication terminal.

5. The method of claim 1, wherein the page message comprises a reserved field for recording the remote control command.

6. The method of claim 5, wherein the page message further comprises at least one of:
   a first field indicating a sequence of a configuration message;
   a second field indicating a sequence of an access message;

a third field for paging at least one mobile communication terminal allocated to a first class;
a fourth field for paging at least one mobile communication terminal allocated to a second class;
a fifth field for paging at least one mobile communication terminal using an identifier;
a sixth field for paging at least one mobile communication terminal of the identifier;
a seventh field for broadcast pages;
an eighth field indicating a length of a specific field added to the page message; and
a ninth field indicating the added specific field.

7. The method of claim 1, further comprising inputting information corresponding to the remote control command by the subscriber at a computer located remotely from the mobile communication terminal.

8. The method of claim 7, further comprising sending the inputted information corresponding to the remote control command across the Internet.

9. A mobile terminal, comprising:
a receiver configured to receive a remote control command transmitted from a base station using a page message, wherein the remote control command is generated based on information from a subscriber located remotely from the mobile terminal; and
a controller configured to operate the mobile terminal in accordance with the remote control command included in the page message, wherein the controller:
verifies a species of the page message by parsing the page message,
extracts the remote control command by analyzing the page message if the page message is for controlling the mobile terminal remotely, and
controls an operating state of the mobile terminal in accordance with the extracted remote control command.

10. The terminal of claim 9, wherein the remote control command relates to a power off command of the mobile terminal.

11. The terminal of claim 9, wherein the remote control command relates to a warning message of the mobile terminal.

12. The terminal of claim 9, wherein the remote control command relates to locking of the mobile terminal.

13. The terminal of claim 9, wherein the page message comprises a reserved field for recording the remote control command.

14. The terminal of claim 13, wherein the page message further comprises at least one of:
a first field indicating a sequence of a configuration message;
a second field indicating a sequence of an access message;
a third field for paging at least one mobile terminal allocated to a first class;
a fourth field for paging at least one mobile terminal allocated to a second class;
a fifth field for paging at least one mobile terminal using an identifier;
a sixth field for paging at least one mobile terminal of the identifier;
a seventh field for broadcast pages;
an eighth field indicating a length of a specific field added to the page message; and
a ninth field indicating the added specific field.

15. The terminal of claim 9, further comprising:
a power supplier configured to power-off the mobile terminal in accordance with the remote control command.

16. The terminal of claim 9, further comprising:
a message outputting unit configured to output a warning message in accordance with the remote control command.

17. The terminal of claim 9, further comprising:
a locking unit configured to lock the mobile terminal in accordance with the remote control command.

18. A method comprising:
inputting information corresponding to a control command at a computer by an individual subscriber;
receiving the control command inputted by the individual subscriber, the control command received at a mobile terminal using a page message; and
operating the mobile terminal in accordance with the control command received using the page message, wherein operating the mobile terminal comprises:
parsing the page message,
extracting the control command from the parsed page message if the page message is for controlling the mobile terminal, and
controlling an operating state of the mobile terminal in accordance with the extracted control command.

19. The method of claim 18, wherein the control command relates to a power off command of the mobile terminal.

20. The method of claim 18, wherein the control command relates to a warning message of the mobile terminal.

21. The method of claim 18, wherein the control command relates to locking of the mobile terminal.

22. The method of claim 18, wherein the page message comprises a reserved field for recording the control command.

23. The method of claim 21, wherein the page message further comprises at least one of:
a first field indicating a sequence of a configuration message;
a second field indicating a sequence of an access message;
a third field for paging at least one mobile terminal allocated to a first class;
a fourth field for paging at least one mobile terminal allocated to a second class;
a fifth field for paging at least one mobile terminal using an identifier;
a sixth field for paging at least one mobile terminal of the identifier;
a seventh field for broadcast pages;
an eighth field indicating a length of a specific field added to the page message; and
a ninth field indicating the added specific field.

* * * * *